(12) United States Patent
Akamatsu

(10) Patent No.: US 9,023,409 B2
(45) Date of Patent: May 5, 2015

(54) LOW CALORIE, NON-GRAIN, VEGAN TREATS FOR COMPANION ANIMALS

(76) Inventor: John William Akamatsu, Seattle, WA (US)

( * ) Notice: Subject to any disclaimer, the term of this patent is extended or adjusted under 35 U.S.C. 154(b) by 401 days.

(21) Appl. No.: 13/588,458

(22) Filed: Aug. 17, 2012

(65) Prior Publication Data

US 2012/0309855 A1 Dec. 6, 2012

Related U.S. Application Data

(60) Provisional application No. 61/524,862, filed on Aug. 18, 2011.

(51) Int. Cl.
*A23K 1/18* (2006.01)
*A23K 1/14* (2006.01)
*A23K 1/16* (2006.01)

(52) U.S. Cl.
CPC .............. *A23K 1/14* (2013.01); *A23K 1/1643* (2013.01); *A23K 1/1833* (2013.01); *A23K 1/1853* (2013.01)

(58) Field of Classification Search
USPC ............. 426/573, 575, 635, 805, 807, 512
IPC ................ A23K 1/14, 1/1853, 1/1833, 1/1643
See application file for complete search history.

(56) References Cited

U.S. PATENT DOCUMENTS

| | | |
|---|---|---|
| 3,044,877 A | 7/1962 | Lent |
| 3,676,150 A | 7/1972 | Glicksman et al. |
| 3,881,024 A * | 4/1975 | Pahoundis et al. ............ 426/578 |
| 4,219,580 A | 8/1980 | Torres |
| 4,243,686 A | 1/1981 | Israilides et al. |
| 4,735,808 A | 4/1988 | Scaglione et al. |
| 4,892,748 A | 1/1990 | Andersen et al. |
| 4,948,609 A | 8/1990 | Nafisi-movaghar |
| 4,978,548 A | 12/1990 | Cope et al. |
| 5,407,696 A | 4/1995 | Hagiwara et al. |
| 5,941,197 A | 8/1999 | Axelrod |
| 6,132,794 A | 10/2000 | Sinha et al. |
| 6,228,418 B1 | 5/2001 | Gluck et al. |
| 6,270,820 B1 | 8/2001 | Fritz-Jung et al. |
| 6,310,090 B1 | 10/2001 | Hayek |
| 6,391,375 B1 | 5/2002 | Fone |
| 6,495,192 B2 * | 12/2002 | Bezreh ......................... 426/635 |
| 6,716,470 B2 * | 4/2004 | Lanter et al. .................. 426/573 |
| 6,746,698 B2 * | 6/2004 | Freeman ........................... 426/2 |
| 6,830,771 B2 * | 12/2004 | Lanter et al. .................. 426/573 |
| 7,211,280 B1 | 5/2007 | Young et al. |
| 7,264,841 B2 | 9/2007 | Lester et al. |
| 7,579,038 B1 | 8/2009 | Weinberg |
| 7,655,266 B1 | 2/2010 | Ichiki |
| 7,901,725 B2 | 3/2011 | Johnson et al. |
| 2004/0058003 A1 * | 3/2004 | Rosenberg et al. ........... 424/486 |
| 2010/0136113 A1 * | 6/2010 | Steer et al. .................... 424/484 |

FOREIGN PATENT DOCUMENTS

| | | | |
|---|---|---|---|
| CA | 2122665 A | * | 11/1995 |
| LU | 87756 | * | 6/1990 |

OTHER PUBLICATIONS

"Bio Services", downloaded from www.bio-services.nl/en/news_en.php (Cached), dated Nov. 2005, 3 pages + 2 page DietGel® Criticare, from the hyperlink provided at p. 1.*
Mazuri® Herbivore Aquatic Gel Diet, Brochure No. 5Z93, 2 pages, dated Jan. 6, 2009.*
Mazuri® Rabbit Diet with Timothy Hay, Brochure No. 53OQ/5M15, 2 pages, dated Jun. 28, 2010.*
Raphael, Wilson Bulletin, vol. 99 (1), 1987, pp. 131-135.*

* cited by examiner

*Primary Examiner* — Chhaya Sayala
(74) *Attorney, Agent, or Firm* — Cooley LLP

(57) ABSTRACT

The invention provides methods of using hay, vegetable and/or fruit pulp, and a hydrocolloid for making animal food; and the food products produced using such methods; and the products then being dried through low-temperature dehydration. The animal food products are free of gluten, grains, legumes, nuts, animal-products, sweeteners, and fats.

15 Claims, No Drawings

LOW CALORIE, NON-GRAIN, VEGAN TREATS FOR COMPANION ANIMALS

CROSS REFERENCE

This application claims the benefit of and priority to U.S. Provisional Patent Application Ser. No. 61/524,862, filed Aug. 18, 2011, titled "Low calorie, non-grain, vegan treats for companion animals", which is hereby incorporated by reference in its entirety for all purposes.

FIELD OF THE INVENTION

The invention relates generally to the production of low calorie, non-grain, vegan food products for animals.

BACKGROUND OF THE INVENTION

Most vegetarian commercial pet treats made for herbivores and other small animals are made with wheat, oats, sugar, molasses, corn, seeds, nuts, or yogurt. These treats for herbivores may cause many serious problems. The ingredients are inappropriate for plant-only-eating animals, specifically foliovores because they contain too many carbohydrates, too much sugar, too much protein, too much starch, too much fat, too-finely ground of hay or fiber, and/or a structure detrimental to dental health. Therefore, there is a great need to develop ideal treats for companion animals such as herbivores.

SUMMARY OF THE INVENTION

It is the primary objective of the invention to provide a treat for herbivores and companion herbivores, such as rabbits, guinea pigs, degus, and chinchillas that do not compromise the animals' health.

It is another objective of the invention to provide a treat for herbivores that more closely replicates the natural diet of herbivores with natural whole foods with minimum processing.

It is another objective of the invention to provide a treat for herbivores that contains no gluten, grains, or added sugar and starches.

It is another objective of the invention to provide a treat for herbivores that promotes good dental and gastrointestinal health.

It is another objective of the invention to provide a treat for herbivores that introduces longer pieces of fibrous hay, not ground hay or hay meal.

It is another objective of the invention to provide a treat for herbivores that is highly palatable, with flavor profiles that extend beyond those of the daily diet to enhance novelty and "specialness."

It is another objective of the invention to provide a treat for herbivores that is capable of delivering nutraceuticals and pharmaceuticals.

It is another objective of the invention to provide a treat for herbivores that offers strong visual appeal for the human caregiver.

It is another objective of the invention to provide a treat for herbivores that is producible in variants suitable for herbivores and companion animals.

These objectives and advantages are attained by a composition that is used as a treat for herbivores such as rabbits, guinea pigs, degus, and chinchillas, and that prior to dehydration comprises the following ingredients: unground hay, juiced plants, and hydrocolloid binders. In some embodiments, the hydrocolloid binders are selected from the group comprising xanthan, guar, agar, carrageen gums, methyl cellulose, gum Arabic, pectins, gellans, gum tragacanth, carboxymethyl cellulose, sodium alginate, or a combination thereof.

In some embodiments, flavorings including herbs, vegetables, fruit, flowers, or extracts can be added as aroma and flavor enhancing ingredients to obtain better animal acceptance.

In some embodiments, unlike conventional pet treat formulas, no salt is added to the animal products of the present invention.

In some embodiments, the present invention provides animal food products. In some embodiments, the products comprise one or more hays. In some embodiments, the products further comprise a first binder, such as a high-fiber vegetable and/or fruit pulp. In some embodiments, the products further comprise a second binder, such as binders that are high in fiber and low in calories, including but not limited to hydrocolloids. In some embodiments, hydrocolloids are selected from the group consisting of xanthan gum, guar gum, agar, carrageen, gum Arabic, gum tragacanth, sodium alginate, methyl cellulose, carboxymethyl cellulose, and a combination thereof. In some embodiments, the products further comprise one or more flavoring agents.

In some embodiments, the products comprise one or more hays, one or more vegetable and/or fruit pulps, and one or more hydrocolloids (e.g., gums). The products may crumble apart very easily without adding the pulp and/or the gum. Not wishing to be bound by any theory, the pulp and the gum seem to react with one another to create a much stronger bond, just like combining certain hydrocolloids.

In some embodiments, the flavoring agents are only necessary to add olfactory appeal both to the human and the animal and, of course, for the animal's taste buds and pleasure.

In some embodiments, the food products comprise about 8% to about 50% by wet weight of hay, such as about 8%, 10%, 15%, 20%, 25%, 30%, 35%, 40%, 45%, or 50%. For example, the food products comprise 15% to about 35% by weight of hay, or about 19% to about 30% by weight of hay.

In some embodiments, the food products comprise about 65% to about 90% by wet weight of vegetable and/or fruit, such as about 65%, 70%, 75%, 80%, 85%, or 90%. For example, the food products comprise 80% to about 90% by weight of vegetable and/or fruit, or about 70% to about 85% by weight of vegetable and/or fruit.

In some embodiments, the binders comprise one or more gums. In some embodiments, the food products comprise about 0.05% to about 3.25% by wet weight of gums, such as about 0.05%, 0.06%, 0.07%, 0.08%, 0.09%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.25%, 1.5%, 1.75%, 2%, 2.25%, 2.5%, 2.75%, 3%, or 3.25%. For example, the food products comprise 0.09% to about 1.0% by weight of gums, or about 0.15% to about 0.75% by weight of gums.

In some embodiments, the food products comprise about 0.1% to about 20% by weight of flavorings, such as about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 11%, 12%, 13%, 14%, 15%, 16%, 17%, 18%, 19%, or 20%. For example, the food products comprise 0.09% to about 1.0% by weight of flavorings, or about 0.2 to about 10% by weight of flavorings. In some embodiments, the flavorings can be wet or dried, or an extract or essence. In some embodiments, the flavorings are extracted from plants by using a juicer, juice extractor, rotary evaporator, or a centrifuge.

The compositions of this invention can be formulated using any appropriate grass or hay. For example, in some embodiments, the hay is selected from one or more of Timothy hay, Orchard grass, or Alfalfa hay. In some embodiments, the hay is not ground.

In some embodiments, the hydrocolloid binders and the hay are mixed using pulp and juices of vegetables and fruits.

In some embodiments, the pulp primarily consists of, or consists essentially of pumpkin. In some embodiments, the pulp consists of about 50%, 60%, 70%, 80%, 90%, 95%, 99% or more pumpkin by weight or by volume.

In some embodiments, the hydrocolloid binder is selected from a group comprising xanthan gum, guar gum, locust bean gum, carrageen, gum Arabic, gum Tragacanth, sodium alginate, high-acyl gellan, low-acyl gellan, high-methoxyl pectin, low-methoxyl pectin, methyl cellulose, carboxymethyl cellulose, or combinations thereof.

In some embodiments, the products are dehydrated at lower temperatures to prevent the internal temperature of the product from exceeding a predetermined temperature. In some embodiments, the predetermined temperature is about 100 F, 105 F, 110 F, 115 F, 120 F, 125 F, or 130 F.

In some embodiments, the products are flavored with at least one additional ingredient. In some embodiments, the additional ingredient is selected from the group consisting of herbs, flowers, spices, extracts, fruits, vegetables, or combinations thereof.

In some embodiments, the products are further reduced in calories. In some embodiments, the calories are reduced by the addition of rice hulls. In some embodiments, the products are further reduced in calories by the use of iceberg lettuce.

In some embodiments, the products are increased in calories. In some embodiments, the calories are increased by the addition of black sunflower seeds. In some embodiments, the calories are increased by the addition of alfalfa hay.

In some embodiments, the products are enhanced with one or more pharmaceuticals, including drugs and prodrugs, and/or one or more biotics, probiotics or the like.

In some embodiments, the products are enhanced with one or more nutraceuticals or other types of supplements, such as vitamins and/or minerals.

The treat is produced by a process that provides unexpected results in solidifying a mixture with a high amount of hay.

In some embodiments, the products of the present invention are formed into specific shapes, such as in the shape of a biscotti or a burrito.

DETAILED DESCRIPTION OF THE INVENTION

Rabbits and Hindgut Digesters

The rabbit is an herbivore, or more specifically a folivore, an animal evolved to exist on a diet of succulent green vegetation. However, its small size makes it a highly-sought prey, and it has a correspondingly high metabolic rate that limits its ability to exist on a low-energy concentration diet. To survive with these problems, first, it is agile and athletic so it can outrun predators, and second, the rabbit has a digestive tract radically different to that of the faster and larger herbivores such as the horse (a colon fermenter) and the ruminants, such as cows, sheep, and goats (gastric fermenters).

Instead, rabbits are hindgut digesters as are guinea pigs, degus, and chinchillas. Most of the digestion takes place in the large intestine and cecum. The rabbit's system: (1) allows a high food (and therefore high energy and protein) intake, (2) separates out the digestible and easily fermentable components of the diet, and (3) rapidly eliminates the slowly fermentable fibrous waste that would otherwise have to be carried around. The system also eliminates the need for having a large absorptive surface area in the large intestine by complete separation of the products of cecal fermentation and the feces, allowing re-ingestion and absorption of bacteria and their by-products in the small intestine. (Rees Davies 2003).

In rabbits, the cecum is about 10 times bigger than the stomach. Along with the large intestine, it makes up roughly 40% of the rabbit's digestive tract. The unique musculature of the cecum allows the intestinal tract of the rabbit to separate fibrous material from more digestible material; the fibrous material is passed as feces, while the more nutritious material is encased in a mucus lining as a cecotrope. Cecotropes, sometimes called "night feces", are high in minerals, vitamins and proteins that are necessary to the rabbit's health. Rabbits and other hindgut digesters eat these to meet their nutritional requirements; the mucus coating allows the nutrients to pass through the acidic stomach for digestion in the intestines. This process allows these herbivores to extract the necessary nutrients from their food. However, too many carbohydrates or sugars or too little fiber can interfere with the cecotrope production, resulting in overactive "fermentation" within the cecum. Cecotropes produced under such conditions tend to be smelly and messy, and the animals will not or cannot eat them. As cecotropes are vital to a rabbit's diet and health, non-consumption can eventually even lead to death through starvation or malnutrition. The bacterial imbalance can lead to gas and bloating, and the pain from bloat can be enough to cause shock and hypothermia and rapid death. And during a bout of GI stasis, the cecum can get backed up, also causing gas and bloat.

GI stasis (GastroIntestinal Stasis) or ileus is a potentially fatal condition in which digestive activity is severely slowed, or even stopped, and that could result in a painful death within 48 hours. Basically, the peristaltic muscles do not contract enough to push water and food (and other eaten material such as fur, carpet, clothing, books) through the gut. The lack of motility means the cecum isn't emptying and producing cecotropes correctly. The bacterial balance in the cecum is altered, and harmful bacteria overgrowth begins to cause gas and bloating. Although a variety of reasons can cause GI stasis, perhaps the most avoidable is an inappropriate diet (low fiber; high protein/high carbohydrate). For this reason, veterinarians and small-animal experts severely restrict the number of carbohydrates and sugars fed to these animals. A detailed description of GI stasis is provided in the article "GastroIntestinal Stasis, The Silent Killer," by Dana M. Krempels, Ph.D.

Pet Treats

The pet food treat business began in 1860 after an American saw sailors giving dogs the ships' leftover biscuits. He began selling dog biscuits of "wheat meals, vegetables, beetroot, and meat." The basic recipe has changed little since. Animal treats still follow the model for human treats, be it a meat-flavored dog biscuit or a rosemary-flavored Guinea pig chew: gluten or grains, starch, sweeteners, protein, dairy or eggs are used to bind the different ingredients. These key ingredients help to bind diverse matter into an altogether different product. And although the shapes change, claims improve, and colors or flavors are added, animal treats for the most part have stayed true to the form of the baked goods preferred by humans.

Like the human's treat, the pet treat is not meant to be a substitution for the recommended daily diet. Treats should be enjoyed intermittently at special occasions, for training or behavior modification, or for rewards. Essentially, they are for building relationships. Often they contain ingredients outside of the normal diet for increased flavor or palatability, such as a better piece of protein, a bit of sweetness, or some otherwise tempting ingredient. The appearance more often is enhanced for the visual appreciation of the human caretaker than for the appreciation by the animal. And while they may include ingredients similar to the recommended diet, as well as contain essential nutrients, vitamins, and minerals, treats do not—or should not—claim to be nutritionally balanced.

As dog and cat owners comprise the largest segment of the pet owning world, it is not surprising that most treats are manufactured for the dog and cat market. Consequently, most treats contain meat, are flavored with animal products to satisfy these carnivorous needs, or freely use animal products or by-products as binding agents. However, some manufacturers have seen that there is a larger crossover market for treats made without meat or animal products. These vegan or vegetarian treats once again depend on gluten or grains, but theoretically can be fed to non-carnivorous animals.

As current pet treat manufacturers base their treats for herbivores on the treats made for humans and carnivorous animals: most manufacturers simply remove the meat from the treats and substitute vegetable matter. Most vegetarian commercial pet treats made for herbivores and other small animals are made with wheat, oats, sugar, molasses, corn, seeds, nuts, or yogurt. The treats basically remain gluten or grain-based, with sweeteners and even animal by-products.

But these treats for herbivores may cause many serious problems: ingredients inappropriate for plant-only-eating animals, specifically foliovores; too many carbohydrates; too much sugar; too much protein; too much starch; too much fat; too-finely ground of hay or fiber; and a structure detrimental to dental health.

Thus, an ideal treat for herbivores—besides being delicious and nutritious—would be one that does not use gluten or grains as a binding agent or as a source of protein or carbohydrates; does not use animal products as a binding agent or as a source of protein, fat or carbohydrates; does not use sugar or any other sweetener as a binding agent or as a sweetener. At the same time, its physical structure allows for better dental health and gastrointestinal health, and allows for variable production, including doubling as a delivery system for nutraceuticals and pharmaceuticals. The ideal treat would also use low temperatures to dry the items to avoid browning (Maillard reaction) and to keep the treat as natural and as unaltered as possible.

Pet treat manufacturers as well as manufacturers of human food have attempted to replace the gluten and grains. Some have substituted different grains such as oats or rice for the wheat, whereas others have attempted to use other ingredients as binders including potato, gelatin or thickened fruit puree (U.S. Pat. Nos. 3,676,150 and 5,941,197). Vegetarian versions of a pet treat have been attempted, usually with grains (U.S. Pat. No. 6,228,418) and as seen in many unpatented vegetarian treats on the market (American Pet Diner Smaks, Aunty Ems' Bunny Biscuits, Pumpkin Oat Crunchers).

Animal and pet food manufacturers have also attempted to create low-calorie products or to create a product from low-cost materials. Cellulose from wood chips or waste material such as cotton gin waste, ground corn cobs, or rice hulls is processed into new forms and fed to animals to either cut calories or to cut livestock raising costs (U.S. Pat. Nos. 3,044,877 and 4,892,748).

Animal and pet food manufacturers have also attempted to enhance the flavor of the herbivore's food through various means such as chemicals, additional plant pulp, and of course, sweeteners (U.S. Pat. Nos. 4,243,686 and 6,495,192).

The prior art discloses neither a formula nor a process to bind unground hay (leaves and stems, panicles, florets, glumes, and seeds), with hydrocolloids, or gums. The prior art discloses neither a formula nor a process to bind unground hay (leaves and stems, panicles, florets, glumes, and seeds), with vegetables or fruits. The prior art does not disclose the final dried product of unground (leaves and stems, panicles, florets, glumes, and seeds), hay, vegetables, fruits, flavoring agents, and gums. The prior art does not disclose a final product derived from low-temperature dehydration. The prior art does not disclose a final product that contains unground hay, juiced plants, and gums.

The invention is a low calorie, vegan food product for herbivore companion animals. The food product is free of gluten, grains, nuts, added sweeteners, and added fats. The food product comprises hay, juiced plants, flavorings, and hydrocolloidial binders such as xanthan gum, guar gum, agar, carrageen, gum Arabic, gum tragacanth, sodium alginate, methyl cellulose, carboxymethyl cellulose, or a combination thereof.

The rabbit, like the Guinea pig, degu, and chinchilla, is an herbivore, or more specifically a folivore, an animal evolved to exist on a diet of succulent green vegetation. These animals have a digestive tract different from horses (colon fermenters) and cows (gastric fermenters). Rabbits, Guinea pigs, degus, and chinchillas are hindgut digesters: most digestion takes place in the large intestine and cecum. The hindgut digester's system: (1) allows a high food (and therefore high energy and protein) intake, (2) separates out the digestible and easily fermentable components of the diet, and (3) rapidly eliminates the slowly fermentable fibrous waste that would otherwise have to be carried around, hampering speed and agility.

The hindgut digester's system eliminates much of the large intestine by complete separation of the products of cecal fermentation and the feces. The products of cecal production are known as cecotropes, or cecal pellets. High in minerals, vitamins and proteins, cecotropes are re-ingested by rabbits and other hindgut digesters to meet their nutritional requirements; the cecotropes' mucus coating allows the nutrients to pass through the acidic stomach for digestion in the small intestines. This process allows these herbivores to extract the necessary nutrients from their food without having unnecessary body weight or without carrying the food around as the cow does in its in four stomachs.

However, when hindgut digesters ingest too many carbohydrates or sugars or too little fiber, this nutritional imbalance interferes with the cecotrope production, resulting in overactive "fermentation" within the cecum. When produced under such conditions, cecotropes tend to have a strong, unpleasant odor, and loose or liquid consistency, and the animals will not or cannot eat them. (Many novice rabbit owners often mistake them for diarrhea.) As cecotropes are vital to a rabbit's diet and health, non-consumption can eventually even lead to death through starvation or malnutrition. Meanwhile, the bacterial imbalance can lead to gas and bloating, and the pain from bloat can be enough to cause shock and hypothermia and rapid death.

Hindgut digesters need to constantly eat and digest and excrete to the point that rabbit owners joke that they never thought they would be upset not to see poop. A potentially fatal condition, GI stasis (GastroIntestinal Stasis) or ileus, occurs when digestive activity is severely slowed or even stopped. Peristaltic muscles do not contract enough to push water and food (and other consumed material) through the gut. This could result in a painful death within 48 hours. The lack of motility also means the cecum isn't emptying and producing cecotropes correctly. With the bacterial balance in the cecum altered, harmful bacteria overgrowth begins to cause gas and bloating. Although a variety of reasons can cause GI stasis, veterinarians and small-animal experts agree that an inappropriate diet (low fiber; high protein/high carbohydrate) is the most avoidable. For this reason, they recommend severely restricting the number of carbohydrates and sugars fed to these animals.

For a long and healthy lifespan with minimized medical complications, companion herbivores—including rabbits, guinea pigs, degus, and chinchillas—need a strict diet of 1) unlimited hay, 2) vegetables and 3) pellets. Treats such as fruits or commercially-prepared goods should be severely limited in quantity and ingredient content.

Hay

Hay should make up the bulk of the diet of domesticated herbivores to the point that veterinarians and animal healthcare experts say that it should be provided in unlimited amounts. Hay provides many benefits and most closely approximates what rabbits and other foliovores eat in the wild.

Hay provides gastrointestinal benefits. As mentioned earlier, rabbits are grazing herbivores that rely on the cecum to extract minerals, vitamins, and proteins from the fibrous food. The rabbit relies on fibrous, indigestible material to help move food, fur, and undigested material through the system, while the stomach and small intestine provide the cecum's microorganisms with water and nutrients. The cecum and its microorganisms break down the fiber, extracting the nutritional material and passing the fibrous material as waste. Proper hindgut fermentation, cecal pellet production, and GI tract motility are dependent on the ingestion of large amounts of roughage, long-stemmed hay, and water. Diets that contain inadequate amounts of long-stemmed, coarse fiber may predispose the animal to gastrointestinal stasis. (Johnson, 2009)

As most domestic pets lead sedentary lives—especially often-caged small animals like rabbits, chinchillas, degus, and guinea pigs—they do not get enough exercise to burn off the calories of a "table food" diet, resulting in obesity and secondary complications. Feeding unlimited pellets exacerbates the obesity problem, especially when the pellets are of the high-protein variety fed to livestock. However, when fed unlimited hay, the animals are less likely to suffer from obesity. The high fiber content of the hay keeps their stomachs feeling full and the animal satisfied. The constant grazing gives them something to do, much like in their natural habitat, so they are not bored, or overeating the pellets, vegetables, or the furniture. Furthermore, the nutritional content of hay is more suitably balanced for the herbivore, with fiber, protein, carbohydrate, and fat contents at levels more in line with the goal of a longer and healthier lifespan.

Many herbivores have open-rooted teeth (aradicular hypsodont) that continually grow throughout their lives, and must be worn down through grinding. But the soft composition of pellets and vegetables don't allow the proper chewing, which should be more molar grinding than a simple up and down motion. A diet of less-fibrous food can result in the formation of points on the teeth, which can cut the tongue and gums, creating ulcers or infection. Teeth can also overgrow, resulting in abscesses at the cheeks that can affect the eyes and sinuses, entrapment of the tongue, malocclusion, or incisors that curve into the gums or nose. Eating whole, unground hay provides exactly the sort of grinding motion needed to wear down the teeth (Rich, 2005).

The hay most highly recommended by veterinarians and others who care for these herbivores (as well as cattle, horses, and others) is Timothy hay (*Phleum pratense* L.). Timothy is a perennial plant of the family Poaceae. It is also known as "Herd grass" or "Hurd grass". Timothy grows to 150 cm tall with its narrow leaves averaging about 45 cm long and 1 cm in width with its flower head appearing to be at least 10 mm broad and 15 cm long. Timothy grass is easily recognizable with its stiff green bayonets that shoot from the ground surrounded with heads that are filled with cylindrically shaped flowers.

Timothy hay is commonly grown for horse and cattle feed, and is considered part of the standard mix for grass hay, providing quality nutrition. Timothy hay also is a staple food for domestic pet rabbits, guinea pigs, chinchillas, and degus, often making up the bulk of their recommended diet. Not only does it provide high fiber, but it also helps to clean and to grind down their constantly growing teeth. Unlimited Timothy hay is always recommended for rabbits and guinea pigs.

When hay is harvested throughout the year, the different harvests—cuttings—are referred to as "First Cutting", "Second Cutting", and "Third Cutting". First Cutting is the first cutting of the year. It is allowed to grow the longest and so it is the most mature, most coarse (not soft) hay with long, fibrous stalks and mature seed heads. It is sweet, soft spring grass, with higher sugar content. Second Cutting is what grows after the First Cutting is harvested; it has a shorter growing season so it is not as mature as First Cutting and tends to be greener, finer, and leafier, with softer stems and fewer seed heads. Second Cutting is more nutritious with increased percentages of crude protein and crude fat, and a lower crude fiber percentage. More non-structural carbohydrates (starches and sugars) and protein are in the leaves than in the stems. These starches and sugars are very digestible and make the hay of higher quality. Third Cutting grows after the Second Cutting is harvested, and is the season's end. Third cutting is the softest of all, and is very dense and fragrant. It tends to be lower in fat and protein than the other cuts. Loose Timothy hay also can be compressed and formed into pellets with Timothy hay pellets being the preferred pellet for companion rabbits and other herbivores. The seed from all cutting can be gathered, milled and ground into Timothy meal for animal food products. And as Timothy seed contains essentially no gluten, when ground into a meal it as an excellent and tasty alternative for baked goods for humans who are gluten-intolerant. Because it has no gluten, or binding properties, it is the purpose of the invention to utilize other sources as a means of binding the hay with itself and other diverse matter. Timothy hay yields about 7% crude protein; about 1.5% crude fat min; about 32.00% crude fiber max; about 0.38%-0.51% calcium; and about 50 calories (1 oz)

Alfalfa hay (*Medicago saliva*) is a flowering plant in the pea family Fabaceae. It is also recommended for rabbits but at limited stages in their lives. Alfalfa hay is much higher in calories and in calcium, so it usually is fed to younger rabbits, pregnant and lactating rabbits, or older and perhaps sick rabbits that need the extra calcium. Typically, rabbits absorb all the calcium in their diet, and so require a limited calcium level of 0.5%-1%. Alfalfa hay should not be fed to any animal prone to kidney stones, bladder stones, or the formation of calcium crystals in their urine. Because it is so low in fiber, yet so caloric, it is highly recommended that alfalfa hay not be fed to companion animals. Alfalfa hay yields about 16% crude protein; about 1.5% crude fat min; about 32% crude fiber max; about 1.19%-1.41% calcium; and about 61 calories (1 oz).

Orchard grass (*Dactylis glomerata* L.) is a bunch-type, tall-growing, cool-season perennial grass. It is much softer than the other grasses. Orchard grass is often fed to small companion animals when either the animal or owner experiences allergic reactions to Timothy. Orchard grass hay yields about 7% crude protein; about 1.5% crude fat min; about 32% crude fiber max; about 0.26%-0.27% calcium; and about 54.5 calories (1 oz).

Oat grass (*Arrhenatherum elatius*) is also known as false oat-grass, tall oat-grass, tall meadow oat, onion couch and tuber oat-grass. It is a bunch-type, perennial grass that grows to 150 cm. It is much softer than the other grasses. Oat grass is often fed to livestock animals as both pasture-grazing and hay (dried) and silage (fermented). Oat grass hay yields about 7% crude protein; about 1.5% crude fat min; about 32% crude fiber max; about 0.26%-0.29% calcium; and about 98 calories (1 oz).

Wheat grass (*Triticum aestivum*) commonly refers to the common wheat plant's cotyledons after germination and before true leaves have formed. As the plant has just germinated, no seeds or grains are produced, so it remains free of gluten. Wheat grass is often processed into wheatgrass powder or the young plants are juiced for human consumption. The plant or powder is often fed to companion animals to help with digestion—most notably, it helps many cats pass hairballs without vomiting them. Wheat hay may refer to the full grown plant, and may include seed heads. It is often fed to livestock when wheat prices are low as the protein content is high. After harvesting the seed heads, the remaining stalks are referred to as "straw" as "hay" is often reserved for the grasses and legume plans grown, cut, dried, baled, and dried for animal feed Wheat grass hay yields about 7.7% crude protein and about 0.13% calcium.

Barley (*Hordeum vulgare* L.), is grown for human and livestock consumption, with over half of the United States' production going towards livestock.

Bermuda Grass (*Cynodon dactylon* L) is also known as dog's tooth grass, Devil's Grass, and Bahama Grass. This short grass often is used for playing fields and for foraging livestock. It is can withstand physical abuse, drought, salinity, and heat. It is invasive in some areas. Bermuda Grass yields about 7.3% crude protein and about 0.24% calcium.

Bluegrass (*Poa pratensis*), commonly known as Kentucky Bluegrass, Smooth Meadow-grass, or Common Meadow-grass, is a perennial cool season crop that goes dormant in hotter weather. It is raised as a forage crop, but also for its sod, seed, and turf. Bluegrass yields about 8.2% crude protein; and about 0.24% calcium.

Brome Grass (*Bromus*) is a cool-season grass that is resistant to temperature extremes and drought because of its deep roots. Spring growth is exceptionally palatable and lush. Later in the season, the plant suffers nutritional loss. It is recommended that it is mixed with alfalfa for livestock foraging. Brome Grass yields about 5.6% crude protein and about 0.24% calcium.

Lovegrass (*Eragrostis tef*), also known as Teff and Love Grass, is an annual grass of NE Africa. It has the same total digestive value as Timothy hay. Lovegrass yields about 14% crude protein and about 0.3% calcium.

Rye (*Lollum* L.) grows in tufts, and is used for ornamental and erosion control plantings as well as being grown for human and livestock consumption. Rye Grass yields about 8.8% crude protein and about 0.53% calcium.

Sudan Grass (*Sorghum bicolor* subsp. *drummondii*) is raised primarily for its foliage for feeding livestock as forage. It is distinguished from *Sorghum bicolor* (commonly called sorghum and less commonly known as milo), which is grown for its grain. Some sorghum hybrids produce cyanide. Sudan Grass yields about 9% crude protein and about 0.43% calcium.

Vegetables

Vegetables should be fresh and preferably leafy, green, and not too caloric; parsley and romaine lettuce are excellent examples. Root vegetables such as carrots and parsnips tend to contain too much sugar, whereas potatoes contain too much starch. Cabbage family members such as broccoli and cauliflower are not recommended as they can cause uncomfortable gas. Iceberg is cautioned against as it has little nutritional value. Legumes also should be avoided as they are high in carbohydrates.

Some vegetables and most fruits contain too much sugar for the hindgut digester. Sweet Florence Fennel, for example, can cause some rabbits to develop an overproduction of cecal droppings. This overproduction results in cecotropes that are soft and odorous, and stick to the rabbit's fur, creating a smelly, smeary and unsightly mess. These cecotropes, being low in fiber and high in carbohydrates and protein, are a good visual indication that there is something wrong in the diet and that future problems with stomach blockages may occur.

Some plants produce toxins or nutrition blockers. Spinach and sorrel should be fed in small quantities because they contain significant amounts of oxalic acid, which can interfere with digestion and nutrition by forming an insoluble complex with calcium, iron, sodium, magnesium, or potassium known as oxalates. Other plant foods high in oxalic acid are buckwheat, star fruit, purslane, poppy seeds, rhubarb, spinach, plantains, ginger, almonds, cashews, peanuts, sorrel, mustard greens, bell peppers, sweet potatoes, soybeans, beets and beet greens, oats, cabbage, green beans, mango, eggplant, tomatoes, parsley, Swiss chard, summer squash, and parsnips. Raw kidney beans contain a vitamin E blocker that increases liver disease in animals. Lima and other broad beans contain high concentrations of cyanogens, while raw carrots contain carotatoxin. Damaged or bruised vegetables or those that have been attacked by mold or fungus manufacture these poisons at a higher rate. Even vegetables not stored properly can produce toxins, such as the psoralens found in poorly handled celery and parsley. (McGee, 2004)

Studies have shown that animals with high olfactory receptors significantly prefer organic vegetables over conventionally-grown produce, even if they are similar in chemical makeup and culinary performance. As organic produce is not sprayed with herbicides, pesticides, and artificial fertilizers, organic produce needs to fight off more microbes and insects and invasive species than conventionally grown produce. Organic fruits and vegetables defend themselves through their own natural botanic structure (thorns, hard shells), and by making themselves unpalatable through the creation of toxins and defensive chemicals known as phytochemicals. These phytochemicals are responsible for most of the aromas from fruits, vegetables, herbs, and spices. Organic produce generally does contain more antioxidants and other potentially healthful—and potentially flavorful—phytochemicals than conventional produce. So while humans, with five million to six million of these odor-detecting receptors in the nasal passage, may not be able to readily distinguish between organic and conventional produce, many animals, such as a rabbit with 100 million receptors, can do so with ease, especially when the produce is locally grown as the produce invariably is fresher, and has not had to withstand shipping and handling abuse.

Pellets

Pellets were developed for the ease of industrial farming. They are mostly compressed ground hay, and oftentimes, pureed and dried vegetables, grains, seeds, and vitamins and minerals. "Stock-rabbit pellets" are fed to rabbits being raised as livestock, in which rapid weight gain is desired. These pellets are low in fiber and high in calories, being mostly alfalfa hay. Since the purpose of these rabbits is to be slaughtered for meat or fur, no priority is given to the long-term effects such as chronic diseases or dental care. A similar pellet is fed to rabbits bred and raised for competitive shows as the high fat and protein content helps develop glossy fur coats.

"Stock rabbit pellets" and "show rabbit pellets" may also cause obesity in companion rabbits. Thus, neither of these pellets is suitable for adult companion rabbits, for these rabbits exist solely as companions to humans; and pet owners typically want their companion animals to live long and healthy lives. Instead, companion rabbits should be fed "companion-rabbit pellets," made with Timothy hay. These pellets have been formulated to be about 18% fiber, and are more nutritionally balanced for the health and longevity of the animal.

Treats

Despite being over 150 years old, pet treats have changed little. They follow the model of the human treat, even taking on the form of pizza, éclairs, and cupcakes, croissants and candy. Gluten, sweeteners, starch, fat, dairy or eggs still bind the different ingredients into a new whole.

Most vegetarian commercial pet treats made for herbivores and other small animals are made with wheat, oats, sugar, molasses, corn, seeds, nuts, or yogurt. Only the meat has been removed, and the protein is replaced with other ingredients. Yet these products manufactured as snacks for companion herbivores fail to take into consideration the true nature of an herbivore's diet, and the products invariably contain ingredients that are harmful to them. Some of the most common ingredients are:

Sweeteners (sugar, molasses, honey, cane syrup, and corn syrup),
Cereals (wheat, oat, barley, corn, rye, rice)
Animal products (dairy, yogurt, egg, whey, gelatin, animal fat).
Seeds, nuts and legumes (sesame, sunflower, almond, coconut, pecans, peas, beans, peanuts, and cashews)

As with humans, research shows that sugar is sugar, no matter what its initial form.

The pleasure of sugar is well known in the human population, as are the dangers of consuming too much sugar. Similar issues exist within the animal kingdom: diabetes and obesity are not uncommon. Degus in particular are highly susceptible to developing diabetes when regularly fed a diet containing added sweeteners. Obesity can cause digestive problems and heart attacks, as well as worsen arthritis and hamper good litter box habits. Yet, obesity within rabbits can cause other problems. In a rabbit or guinea pig, obesity also can prevent a rabbit from accessing the cecotropes, slowly starving the animal of essential nutrients. And obesity can also complicate diagnoses with X-rays and complicate actual surgical procedures.

Cereals, grains, or cereal grains are grasses (members of the monocot families Poaceae or Gramineae) cultivated for the edible components of their fruit seeds (botanically, a type of fruit called a caryopsis): the endosperm, germ, and bran. The most common grains are wheat, maize (corn), rice, millet, oats, barley, rye, sorghum (milo), triticale and emmer. (Buckwheat, quinoa and amaranth are not from grasses and are considered pseudocereals.) These grains are processed by milling, polishing, grinding, malting, and cracking. Most notable is grinding, wherein the grain is ground into a fine meal or flour that binds well with other ingredients, that shapes easily, and that contributes a pleasing texture or toothsomeness to finished products. Nearly every single snack on the market for herbivores contains oats, wheat, corn, or rye. They are high in carbohydrates and relatively low in fiber. As noted earlier under Rabbits and Hindgut Digesters, items high in carbohydrates are dangerous for these animals.

Animal products and by-products do not belong in the diet of a healthy herbivore. While mother's milk should be fed to babies, there is no reason to continue feeding it to older, healthier animals (especially the milk of another species). The protein and carbohydrate mixture is too rich for the herbivores' digestive systems. The same is true with eggs and fat. Some companies have taken to coating legumes or grass pellets with a sugary, yogurt coating. These "yogurt drops" are visually appealing to humans with their pastel, candy-like colors, but rabbits have poor close-up vision. Furthermore, rabbits are unable to distinguish between colors other than green or blue, and the image would be very "grainy", like a cell phone photo taken in low light.

Seeds, nuts and legumes are also highly common in snacks. However, rabbit metabolism is geared for a low-fat diet, and the excess is not burned but is stored as body fat. Rabbits appear to be more sensitive to fat than humans are, and in addition to obesity, the excess fat can accumulate in the rabbit's liver and arteries (atherosclerosis). Veterinarians have reported that rabbits fed seed-rich diets have a much higher incidence of fatty liver disease (hepatic steatosis), which is often fatal. These seeds and grains are also rich in starches. While some of this starch is digested in the small intestine, much of it is not accessible until it reaches the cecum. There, though, it becomes a powerful energy form for the cecal microorganisms; unlike cellulose fiber such as hay, which slows fermentation, starch in the cecum ferments rapidly and can lead to bacterial overgrowth, bloat, GI stasis, malnutrition, and death. (Smith) For a domestic chinchilla, eating a seed or a nut could irritate the digestive system to the degree that it results in death.

As the listed inappropriate ingredients show, a need remains for the development of a new treat that expands the idea of what a treat for an herbivore should be. The treat would 1. be highly palatable, going beyond the flavor profiles of the daily diet,
2. be nutritiously balanced without introducing harmful nutrients,
3. be structured to encourage chewing by the grinding of teeth,
4. provide high fiber though the introduction of longer pieces of hay, not ground hay or hay meal,
5. be producible in variants suitable for all sizes of herbivores and other animals,
6. act as a delivery system for pharmaceuticals or nutraceuticals,
7. offer strong visual appeal for the human caregiver.

Advantageously, the invention seeks to address this need.

For being nutritionally detrimental, the invention rejects the use of grains as either a separate ingredient or binder. Therefore, some embodiments of the invention use mostly chopped, whole Timothy hay (leaves and stems, panicles, florets, glumes, and seeds), not ground hay and not meal ground from milled hay seed. Timothy hay is the most nutritionally-balanced of the hays. The chopped hay retains all the fibrous qualities of the hay, which are closer to the natural state of the grasses eaten in the wild. These fibrous qualities are essential for removing fur from the animal's digestive system and for removing other fibrous materials from the system; the chopped hay provides the material to keep the animal chewing by grinding its teeth, a necessary motion to grind down the ever-growing teeth. By using chopped hay instead of ground hay, the invention at long last meets the nutritional and physical needs not currently met by solely ground hay products available on the market.

Because of the health risks involved, some embodiments of the invention reject the entire use of seeds as either a separate ingredient or as a binder. The preferred embodiment of the invention does not use grains, nuts, or foreign seeds, and thus does not introduce any items that are too rich in carbohydrates or fats for a healthy herbivore. It remains free of seed, grain and nut meals, otherwise known as flours. It does not introduce any additional sweeteners, starches, proteins or fats; as herbivores are vegan, the treat does not introduce any animal products or by-products.

The invention relies on two types of binders: high-fiber vegetables that are high in fiber but also low in calories and fat such as squashes (e.g., pumpkins); and binders that are high in fiber and low in calories such as hydrocolloids, powders that set or thicken when mixed with water. These binders take the place of the gluten or starches or proteins that typically hold together conventional animal treats.

Many fruits or vegetables will bind because of their high sugar, fat, starch or pectin content. However, the squashes offer a particularly attractive low calorie to fiber ratio. Of all the commonly-known squashes, pumpkin is the lowest in calories per serving. With their rich orange color, pumpkins are full of beta-carotene, just like that best known of orange vegetables, the carrot. While pumpkin contains fewer calories and less sugar than carrots, they have similar amounts of dietary fiber, roughly 2.9 g per 100 g. Because of this fiber, pumpkin is fed to dogs and cats as a dietary supplement for certain digestive ailments such as constipation, diarrhea, or hairballs. Rabbit owners give it to their rabbits when the rabbits will not or can not eat hay. Pumpkin also has less sodium and calcium than carrots. Pumpkin is also believed to have medicinal properties such as being anti-diabetic, anti-oxidant, anti-carcinogenic, and anti-inflammatory. The same qualities that give pumpkin its cohesive creaminess when pureed also make it a superior binder agent. Pumpkin is available fresh in the autumn and winter, and throughout the year as a processed and canned item. It is also readily available as a dehydrated and a freeze-dried product as well as in powdered form.

All pet treats currently on the market rely on some ingredient to bind the disparate ingredients; most commonly it is gluten as found in cereals, but starches, sugars or animal products such as fats or proteins have been used as binders, too. In lieu of these traditional binders, the invention, instead, relies on the use of alternative binders, chosen from a group of preferred hydrocolloids.

A hydrocolloid is simply a substance that forms a gel when microscopically dispersed in water. Hydrocolloids can thicken a substance, form gels, and stabilize foams, dispersions, and emulsions. Some hydrocolloids are as familiar as tapioca or gelatin, or have been known since ancient times, whereas others are newer or even synthetic. Some, like pectin, are eaten every day in thickened jams and jellies. Others hold the toothpaste together when squeezed from the tube, or hold the ketchup in the bottle until enough force will cause it to assume a less viscous state. Other hydrocolloids keep salad dressing ingredients evenly dispersed and suspended in a stabilized mixture of oil and vinegar, or prevent large ice crystals from disrupting the creaminess of ice cream. Hydrocolloids tend to remain less processed by the body's digestive system, and thus are eliminated, as opposed to starches. Some hydrocolloids have some flavor, but are used in such minute amounts that the taste remains undetectable. All of the listed gums are used in minute amounts, and are completely safe for consumption by humans and animals with little to no side effects.

All powdered hydrocolloids must be mixed with water, just as one makes a slurry of flour with water for a roux. However, the process involves the extra steps of dispersing the hydrocolloid in water, and then hydrating it, which means that the powder is first mixed into the liquid, and then it is mixed so thoroughly that water covers every hydrocolloid molecule. Swollen lumps, or "fish eyes", is an indication that proper hydration did not occur. Hydration can be helped along with high shear forces, and sometimes temperature increases. In some embodiments, hydrocolloids are selected from the group consisting of xanthan, guar, agar, carrageen gums, methyl cellulose, gum Arabic, pectins, gellans, gum tragacanth, carboxymethyl cellulose, sodium alginate, and a combination thereof.

Xanthan (Xanthum) Gum

Xanthan gum is a polysaccharide, produced by the fermentation of glucose, sucrose, or lactose by the *Xanthomonas campestris* bacterium. After a fermentation period, the polysaccharide is precipitated from a growth medium with isopropyl alcohol, then dried, and ground into a fine powder. During food processing, it is often added to a liquid medium to form the gum although it may be mixed with other dry ingredients.

Xanthan gum is a good binder to use in the present invention as it is easily and reliably acquired, is a more familiar ingredient due to the common use in ice cream and gluten-free products, does not need extra heat dispersion/hydration, and does not need ion-based coagulants or sequestrants for binding. As either gum or powder, xanthan is used as a food additive and rheology modifier, commonly used as a food thickening agent (in salad dressings, for example), and incorporated as an emulsifier or stabilizer (in cosmetic products, for example, to prevent ingredients from separating). For gluten-free products, it is often added to increase viscosity and volume, and to bind disparate ingredients. In the pet-food industry, xanthan gum replaces liquid milk, stabilizes water-insoluble ingredients, keeps items from "weeping" (syneresis) and thickens gravy. Xanthan gum has extensive uses in industrial application (ceramic glazes, oil recovery, paint); however, this invention is only concerned with properties in regards to food or edible products.

Even at low concentrations, xanthan gum shows a high degree of viscosity in comparison to other gums. This means smaller amounts—on the order of about 1%—can be added to food mixtures than other binders or gums. In fact, the usual amount added is about 0.5% but can be as low as about 0.05%. About 0.1% by weight can yield a thick liquid, and about 0.5% can yield a thick paste. Food flavor release and mouth-feel are also enhanced by xanthan gum's pseudo-plastic qualities. Xanthan gum is notably more pseudo-plastic than other hydrocolloids, so it readily lends itself to items like ketchup, which must flow but then stop. Since it is tasteless, it does not affect the flavor, taste, and smell of other food ingredients. When mixed with galactomannans—most notably, guar gum or locust bean gum—the viscosity is greater than when either one is used alone, so less of each hydrocolloid each can be used. Hydrocollodial combinations also show improved rheological properties, better texture and mouthfeel in comparison to pure locust bean gum or guar gum solutions.

Xanthan gum remains stable under a variety of conditions. It tolerates a wide range of temperatures. It prevents ice crystal formation in ice cream, and it retains its viscosity after food processing heat treatment such as canning or sterilization. It also remains stable under a wide range of pH values. It has a negligible calorie count of about 0.6 kcal/g. In a representative brand, 100 g contains: Protein 6 g, Energy 1497 kJ/358 kcal, Carbohydrate 81 g, Sodium 3846 mg, Fat 0.5 g, and Fiber 84 g.

The food additive E number is E415. Information concerning this material is also disclosed in a product information bulletin published by Jungbunzlauer of Basel, Switzerland, with the title "Xanthan Gum."

E numbers are codes for chemicals which can be used as food additives for use within the European Union and Switzerland. They are commonly found on food labels throughout the European Union, and increasingly in North America. Safety assessment and approval are the responsibility of the European Food Safety Authority. The numbering scheme follows that of the International Numbering System (INS) as determined by the Codex Alimentarius committee.

Guar Gum

Guar gum, also called guaran, is a galactomannan. It is primarily the ground endosperm of guar beans. The guar seeds are dehusked, milled and screened to obtain the guar gum. It is typically produced as a free-flowing, pale, off-white colored, coarse to fine ground powder. Guar gum is more soluble than locust bean gum and is a better stabilizer. Unlike locust bean gum, it is not self-gelling. However, either borax or calcium can cross-link guar gum, causing it to gel. It is less stable in high acid or high base solutions than the other hydrocolloids.

Guar gum shows high low-shear viscosity but is strongly shear-thinning. It is very thixotropic above concentration 1%. It has much greater low-shear viscosity than that of locust bean gum, and also generally greater than that of other hydrocolloids. As noted earlier, guar gum shows viscosity synergy with xanthan gum. Guar gum is economical because it has almost 8 times the water-thickening potency of cornstarch—only a very small quantity is needed for producing sufficient viscosity. Like xanthan it can be used in various multi-phase formulations: as an emulsifier because it helps to prevent oil droplets from coalescing, and/or as a stabilizer because it helps to prevent solid particles from settling.

The food additive E number is E412.

Locust Bean Gum

Locust bean gum (also known as LBG, carob gum, carob bean gum) also is a galactomannan. It is a vegetable gum ground from the endosperms of Carob tree seeds. Locust bean gum occurs as a white powder. When made into powder, it is sweet—with a flavor similar to chocolate—and is used to sweeten foods and as a chocolate substitute. The powder is used as a thickening agent and gelling agent in food technology as well as used in pet foods. It is dispersible in either hot or cold water, forming a sol having a pH between 5.4 and 7.0, which may be converted to a gel by the addition of small amounts of sodium borate.

The food additive E number is E410.

Agar

Agar or agar-agar is a gelatinous substance derived from a polysaccharide that accumulates in the cell walls of agarophyte red algae, primarily from the genera *Gelidium* and *Gracilaria*, or seaweed (*Sphaerococcus euchema*). Commercially it is derived primarily from *Gelidium amansii*. Agar-agar is a natural vegetable gelatin counterpart. White and semi-translucent, it is sold in packages as washed and dried strips or in powdered form. It can be used to make jellies, puddings, and custards. It is chiefly used as an ingredient in desserts throughout Asia or as a thickener in American salsas and also as a solid substrate to contain culture medium for microbiological work. Agar-agar is approximately 80% fiber, so it can serve as an intestinal regulator. Its bulk quality is behind the Asian fad diet, the kanten diet (the Japanese word for agar-agar). Once ingested, kanten triples in size and absorbs water. This results in the consumer feeling more full.

The food additive E number is E412.

Carrageen

Like Agar, Carrageenans (or carrageenins) are a family of polysaccharides that are extracted from red seaweeds. Gelatinous extracts of the *Chondrus crispus* (also known as Irish Moss) have been used as food additives for hundreds of years. (Carrageenan is named for an Irish fishing village, where they made a blancmange or pannacotta-like dessert from the seaweed and sweetened milk.) It is an acceptable vegan alternative to animal-derived gelatin. A particular advantage is that carrageenans are pseudoplastic—they thin under shear stress and recover their viscosity once the stress is removed. So as applied to something like toothpaste, it can be squeezed from a tube, but it will retain that round shape of the nozzle once on the toothbrush. There are several varieties of carrageen used in cooking and baking.

Kappacarrageenan produces a gel that is more rigid and brittle, and is used mostly in breading and batter due to its gelling nature.

Lambda carrageenan is a non-gelling variety that assists in binding, retaining moisture and in contributing to viscosity in sweet doughs.

Iota carrageenan produces a gel that is more elastic or softer, and is used primarily in fruit applications and puddings; it requires calcium ions to develop a heat-reversible and flexible gel.

The food additive E number is E407.

Low-Methoxyl (LM) Pectin and High-Methoxyl (HM) Pectin

Most commercial pectin is derived from citrus plant cell walls. The main use for pectin is as a gelling agent, thickening agent and stabilizer in food. The classical application is giving the jelly-like consistency to jams or jellies, which would otherwise be sweet juices. Pectin can also be used to stabilize acidic protein drinks, such as drinking yogurt, and as a fat substitute in baked goods.

LM Pectin works best at pH from 2.8 to 6.5. It sets at 50 to 70° C. (depending upon calcium present: about 30-50 mg of calcium per gram of Pectin). LM Pectin is synergistic with Locust Bean Gum. It is typically used in low calorie jellies with lower sugar content.

HM Pectin works best at pH from 3.2 to 3.3. It is available both as a rapid and slow setting additive, the former being used in large scale production while the latter is best used in small batch production.

The food additive E number is E440i.

Gellan Gum: Low-Acyl Gellan and High-Acyl Gellan

Gellan gum is a hydrocolloid from the microbe *Sphingomonas elodea*, produced through fermentation. This gelling agent at low use levels can be used alone or in combination with other products to produce a wide variety of interesting textures.

Low-acyl gellan forms hard, non elastic, brittle gels and fluid gels. It soluble in hot or cold water and has a set temperature of 30°-50° C. (86°-122° F.). Once set it is heat stable. High-acyl gellan forms soft, elastic, non-brittle gels. It soluble in hot water and has a set temperature of 70°-80° C. (158°-176° F.). It is thermo-reversible and will remelt after setting if heat is reapplied.

The food additive E number is E418.

Sodium Alginate

Sodium Alginate is derived from brown algae. In extracted form, it can absorb 200-300 times its weight in water. It has gained much popularity in the culinary world the past decade as the key ingredient in molecular gastronomy's spherification process, but previously had been used to "gel" everything from cat food to the pimento pieces of stuffed olives.

The food additive E number is E407.

Gum Arabic

Gum Arabic, also known as acacia gum, chaar gund, char goond, or meska, has been in use since antiquity. It is collected from certain Acacia trees. In food preparation, it is popular in syrups, gummy candies, edible glitter, and marshmallows. It is also used in the printmaking, photography, and watercolor painting. As it is a naturally occurring substance, its composition remains unpredictable from season to season, tree to tree.

The food additive E number is E414.

Gum Tragacanth

Gum Tragacanth, also known as goat's thorn, locoweed, shiraz gum, shiraz, gum elect or gum dragon, is a natural gum obtained from the dried sap of legumes, specifically a Middle Eastern genus *Astragalus*. Although not commonly used in the Western world due to supply issues, it is ideal for detailed confectionary work. Typically, only half as much is needed in comparison to other gums such as gum Arabic.

The food additive E number is E413.

Methyl Cellulose (or Methylcellulose)

Methyl cellulose is a synthetic chemical compound, produced by heating cellulose with a caustic solution (e.g. a solution of sodium hydroxide) and treating it with methyl chloride. It is used in similar food products as xanthan gum to increase viscosity and thickening properties. Like agar-agar, methyl cellulose makes an excellent vegetarian substitute for gelatin. It is also used as an emulsifier, preventing the separation of two mixed liquids. Its hydrophilic properties make it useful for treating both constipation and diarrhea. When mixed with cold water, it tends to form a gluey layer, with the interior remaining dry powder, so precautions must be taken when mixing it. Gluten intolerance and celiac websites suggest that a baker use xanthan gum as a binder for breads, muffins, and pastries and to add texture, and that methyl cellulose be used to add volume.

The food additive E number is E401.

Carboxymethyl Cellulose (CMC)

Another synthesized chemical compound, CMC is used as a thickener and emulsifier. It can often be found in ice cream to stabilize the emulsification.

The food additive E number is E466.

Additional Considerations

In keeping with the herbivore's natural vegan diet, the invention uses no animal products such as meat, eggs, dairy, fat, or collagen. It also stays away from binders such as gelatin and rennet, which come from animal parts, and starch-based hydrocolloids such as tapioca, kudzu and konjac.

As noted, it is the primary objective of the invention to provide an animal snack that does not contribute to obesity or contribute to the detriment of the animal. The high percentage of hay allows the treat to be given to the animal in much larger quantities without contributing to the overproduction of cecotropes, GI stasis, obesity or diabetes. As the hay is also an appropriate food for herbivores, and the major part of balanced diet, this should not contribute negatively to the health of the animal. And although the benefits of chopped whole hay are greatly recognized and are not to be diminished, ground Timothy hay or ground Timothy pellets may also be beneficial. They provide a finer-textured particle that fits between the nooks and crannies of the larger pieces of hay, much like sand does when mixed with larger aggregate like gravel for concrete. In doing so, it creates a more stable, strong product that is less susceptible to breakage, flaking, and crumbling.

A variety of flavors will be offered to sustain the novelty and sense of treat or specialness. These will be for the animal as well as the human caregiver. Flavor profiles may reflect seasonal changes such as berries in the summer; holiday traditions such as pumpkin or cranberry at Thanksgiving; or cultural such as a play on the song "Scarborough Fair" with parsley, sage, rosemary, and thyme.

The reduced number of calories in the treat is related to the fact that the majority of the finished product is fibrous hay, not grains, sweeteners, starches, fats, or proteins. Each hydrocolloid binder is very low in calories as well. Xanthan gum, for example, has minimal calories and as used by the invention in some embodiments is less than about 0.21% by wet weight.

The combination of gums can be varied to create a more brittle or rigid product that creates a nice crunchy texture and sound, or a more flexible, softer product that can withstand impact such as an edible coating around a toss toy.

Vegetable and Fruit Pulps/Juices

Juiced plants (both juice and puree) may include but are not limited to: pumpkin, romaine, banana, apple, parsley, cilantro, kale, basil, endive, mango, pineapple, beet and beet greens, celery, carrot and carrot tops, baby bok choy, radish greens, mint, raspberry and blackberry and their leaves, maples leaves, watercress, mustard greens, and lemon balm. In some embodiments, plant materials other than hay comprise about 21% to about 65% by wet weight of the finished dried product. The use of juice maximizes flavor profiles without introducing any additional water, thus shortening drying times and limiting flavor dilution and nutrient loss.

Flavorings

Items added in smaller amounts for flavor may include but are not limited to: fruits (e.g., banana, apple, cranberries, raisins, currants, strawberries, raspberries, and blueberries), flowers (e.g., roses, lavender, chamomile, calendula, hibiscus, rosemary, fennel), herbs and spices (e.g., cilantro, anise, rosemary, thyme, tarragon, basil, oregano, marjoram, mints, catnip, lemon balm, cinnamon, nutmeg) and extracts (e.g., vanilla, banana, mint, maple).

Any of the vegetables or flavorings may also be used as a garnish or decoration.

Animal Testers

Rabbits and guinea pigs used for testing sampled finished products for smell, flavor, appearance, and texture. Testers included animals from different and random households, various animal rescues, and the tester animals of other pet product businesses.

Product Shaping

The treat is shaped either through rolling and cutting or stamping; by shaping onto other objects such as sticks, blocks or balls; by freehand shaping it as with dumplings or drop biscuits; by pressing into a form from which it is subsequently released; or by extrusion into desired shapes.

Product Dehydration

As heat can destroy enzymes, nutrients, and vitamins, the invention utilizes the process of low-heat dehydration to transform the dough into the finished, hardened product. It is believed by the followers of "raw foodism" that no cooking, or low-temperature cooking, not only helps retain nutritional value, but that higher temperature cooking can actually do harm. Cooking foods produces advanced glycotoxins (advanced glycation end-products), and creates harmful toxins and possible carcinogens. Ideally in "raw foodism," the temperature never exceeds 40-49° C. (104-120° F.). Thus, the invention's treat dough is dried in a regulated dehydrator so that the treats are not subjected to heat higher than 40-46° C. (104-115° F.). Indeed, testers rejected those grass treats baked or dried at temperatures of 250° F. and higher as unacceptable, especially when the Maillard reaction occurred and the items browned. Higher temperatures may be utilized within the first hour to remove excess moisture without destroying the integrity of the final product. The Maillard reaction, however, is what gives the abundant and tasty flavors to items using grains and proteins.

Additional Uses

It can be appreciated that the invention has uses outside of herbivores. Other companion animals and wildlife would benefit. For example, a cat toy could have increased herbs (catnip) and use a gel with more flexible qualities so that the resulting mixture could be spread around a cat's toss toy. A mixture of grasses known commonly as "cat grass" (usually wheat, rye, oat) could be used in place of the Timothy. This grass mixture provides a hairball remedy that induces the hairball to be passed rather than vomited. Seeds also could be utilized to create a treat for birds and rodents, both domesticated and wild. Alternatively, the compositions of the invention can be fed to other larger herbivorous animals including but not limited to goats, sheep, zebras, deer, horses, cows and the like.

Additional Ingredients

The invention's primary goal is to offer an alternative to the sugary, grain-based, carbohydrate-rich treats offered on the commercial market. At the same time, it offers an item that can be fed in greater amounts that also have proven beneficial qualities. However, there may be times when the invention takes on different aspects such as the delivering of nutracuticals, pharmaceuticals, and weight control.

Vitamins and minerals can also be added to these treats. Enzymes such as bromelain and papain that are helpful in dissolving masses of food, mucus and digested fur can be added as a digestive aid; these enzymes could be added as either juiced fresh fruit or in powdered form. As the treat does not use excessive heat, the enzymatic properties of the enzymes would be better preserved than in baked items.

The caloric intake can be increased for underweight animals by adding fat in the form of seeds. Although not recommended as part of a daily diet for healthy animals, seeds offer an alternative to animals that need to gain weight. In certain embodiments of the invention, black sunflower seeds and/or alfalfa hay are added to achieve a pet treat with high-quality fat content to aid underweight animals. Fat is preferred to high carbohydrates or protein as too high of an intake of carbohydrates will throw the digestive system, the cecum in particular, out of balance.

Conversely, the caloric intake can be decreased for overweight animals by adding inert ingredients in the form of vegetable hulls. Although not recommended as part of a daily diet for healthy animals, hulls offer an alternative to animals that need to lose weight. The hulls reduce calories provided in the form of protein, carbohydrates, fats, and starches, and act as fiber; furthermore, they do not absorb water as readily as other fibrous material. The most preferred ingredient of the invention for weight loss uses rice hulls as the inert ingredient with additional wet vegetable pulp provided by the nutritionally-inert iceberg lettuce.

The present invention is further illustrated by the following examples that should not be construed as limiting. The contents of all references, patents, and published patent applications cited throughout this application, as well as any figures, are incorporated herein by reference in their entirety for all purposes.

EXAMPLES

Example I

Carrot and Fennel Recipe

| Ingredient | Baker's % | % by wet weight | % by dry weight |
|---|---|---|---|
| Hay | 100% | 21.10 | 71.01 |
| Pumpkin | 206% | 43.35 | 15.32 |
| Carrot | 150% | 31.65 | 10.65 |
| Fennel | 13% | 2.64 | 0.89 |
| Vanilla extract | 2% | 0.42 | about 0.00 |
| Anise extract | 1% | 0.21 | about 0.00 |
| Cinnamon | 2% | 0.42 | 1.42 |
| Xanthan Gum | 1% | 0.21 | 0.71 |

Baker's percentage (Baker's %), as known as Baker's math, or formula percentage, refers to a notation method utilized by bakers (or chefs) to indicate the flour-relative proportion of ingredients used when producing baked goods and other pastries. Baker's percentage expresses each ingredient in parts per hundred as a ratio of the ingredient's mass to the total flour mass (that is, the unit mass):

baker's percent(ingredient)=100%×ingredient mass/flour mass

Since hay is the largest ingredient by finished dry weight, hay is used as the reference ingredient in lieu of flour.

Hay was chopped into manageable lengths (e.g., about 0.25" to about 0.75"). The xanthan gum is mixed with the cinnamon and then mixed with the carrot juice. It is then blended in a high speed industrial blender for even dispersion and rehydration, and then further blended with the remaining vegetable juices/pulp or puree along with the flavorings. The wet mixture is then combined in a bowl with the hay, and mixed thoroughly, coating all dry ingredients with an even coating of the wet binding mixture.

Example II

Banana Recipe

| Ingredient | Baker's % | % by wet weight | % by dry weight |
|---|---|---|---|
| Hay | 100% | 20.64 | 71.01 |
| Pumpkin | 206% | 42.41 | 15.32 |
| Banana | 110% | 22.70 | 8.88 |
| Romaine | 63% | 12.90 | 2.66 |
| Vanilla extract | 2% | 0.41 | about 0.00 |
| Banana extract | 2% | 0.31 | about 0.00 |
| Cinnamon | 2% | 0.41 | 1.42 |
| Xanthan Gum | 1% | 0.21 | 0.71 |

The hay was chopped and mixed with other ingredients according to the method described in Example I.

Example III

Floral Recipe

| Ingredient | Baker's % | % by wet weight | % by dry weight |
|---|---|---|---|
| Hay | 100% | 22.70 | 60.58 |
| Pumpkin | 206% | 46.65 | 3.01 |
| Apple | 100% | 22.70 | 6.06 |
| Lavender | 3% | 0.57 | 1.51 |
| Roses | 3% | 0.57 | 1.51 |

-continued

| Ingredient | Baker's % | % by wet weight | % by dry weight |
|---|---|---|---|
| Hibiscus | 13% | 2.84 | 7.57 |
| Chamomile | 3% | 0.57 | 1.51 |
| Calendula | 13% | 2.84 | 7.57 |
| Rose water | 2% | 0.34 | about 0.00 |
| Xanthan Gum | 1% | 0.23 | 0.61 |

The hay was chopped and mixed with other ingredients according to the method described in Example I.

Example IV

Molded Form Products

One acceptable product of the invention was a molded item, in the shape of small Italian cookie, called the "cantucci," but known commonly in North America as "biscotti." (In Italy, biscotti refers to cookies in general.) The product was flavored with fennel fronds, giving the traditional or at least familiar anise flavor. The biscotti was about 2.75"×1"× 0.25" and weighed about 3 grams. The final "dough" is firmly pressed about 0.25"-75" thick into molds shaped like the traditional Italian cantucci cookie, removed from the mold and placed onto trays, and dehydrated, first at around 135 for about 1 hour, depending on thickness and mixture wetness, then lowered to 115 until dry.

Example V

Rolled, Cut or Stamped Product

The "dough" is the same as above, but with larger pieces of hay, about 4"-6". The final dough is rolled about 0.125" thick, scored at desired dimensions or stamped with desired shape, and dehydrated, per Example IV. The crackers are then cut along the score marks.

Example VI

Extruded or Pressed Product

The invention could also be extruded or pressed via mechanical means, e.g., a cookie press such as those used for making "spritz" or a pastry bag. They are then dehydrated, per Example I.

Example VII

Wrapped Product

Another acceptable product was a wrapped product, this time in the shape of burrito, with the invention wrapped in edible plant leaves like a burrito. The burrito was about 2"×1" and weighed about 3-5 grams. The dough is shaped by hand like a dumpling into a "cigar" shape of approximately 1.5"× 0.75". The "cigars" are wrapped in a leaf such as romaine, kale or maple, and then dehydrated, per Example IV.

Example VIII

Lollipop or Shish Kebab Product

Another acceptable product was the "cigar" shape of the previous example or a sphere molded onto a dehydrated edible, nontoxic stick about 3-6" long with a diameter of about ⅛-¼" and dehydrated, per Example IV. This example could also have a small premium treat (such as a piece of solid fruit) at the center, similar to a lollipop with a piece of gum at the center.

Example IX

Cultural Pastry Product

As rabbits are associated with the moon in many Asian cultures, the treat could be shaped like traditional Asian pastries like Moon Cakes for enjoyment during the Asian lunar festivities, such as those that celebrate the Rabbit on the Moon. The cakes could be molded or stamped with traditional Asian pastry imprints as well, or be garnished with the appropriate trim such as an edible seasonal, leaf, branch, or fruit, and dehydrated, per example IV.

The treat could also be molded between two pieces of dyed yucca, a favored chewing material for herbivores and birds. The result looks like the French macaron, ice cream sandwich or sandwich cookie. Similarly, it could be mounded on a piece of yucca to resemble a coconut macaroon.

Example X

Toss Toy Product

By altering the amount and combination of gums, it is possible to create a somewhat more elastic, pliable or resilient product. The resulting mixture could then be shaped onto a sphere, cube, or some other form for a toss toy. For example, mixed with the herb catnip, the finished product would be suitable for a cat.

Example XI

At Home Mixture

The product can be sold as a packaged mix for preparation at home. The packaged mix would include chopped hay, dehydrated or freeze-dried vegetable pulp or puree, hydrocolloids, and dried flavoring agents. The customer then adds a suitable liquid or moist ingredient to the mixture and blends them together. Accompanying instructions will instruct a person to properly prepare and dehydrate the product using common household appliances.

Example XII

Obesity Product

The use of cereal hulls as an inert ingredient provides a filler that is not harmful to the animals. This would allow the treat to be fed to an obese animal without weight gain, but still offering the rewards of a treat.

Example XIII

Weight Gain Product

Use of seeds such as black sunflower seeds can be used to help an underweight or sick animal gain weight while still providing the essential fiber provided by alfalfa hay, which also can help an herbivore gain weight in a safer manner.

Example XIV

Rabbit Feeding

A composition of the invention was produced using the Carrot and Fennel Recipe of Example I, the Banana Recipe of Example II, and/or the Floral recipe of Example III, and formed into the biscotti (cantucci) shaped products of Example IV. One or more of the different biscotti compositions were then fed to 30 different adult rabbits between the ages of 1 and 11 years old, and 8 young rabbits between the ages of 5-11 months old.

All the rabbits grabbed the biscotti when they were placed in front of them and consumed them until they were gone, with the exception of a single rabbit that does not like or eat hay. The rabbits were observed for 48 hours after eating the biscotti and appeared healthy and active with no visible side effects. They consumed water, hay and their daily rations of vegetables and pellets normally. The rabbit droppings were normal, appearing uniform, oval and medium to dark brown. No clumped droppings, pitted soft droppings or diarrhea or excessive cecotropes were noted as often results from feeding rabbits commercially available treats with high amounts of sugar, starch or other unhealthy ingredients. No bloating or lethargy was observed.

Example XV

Non-Rabbit Feeding

Similar results were observed when one or more of the same types of biscotti as set forth in Example XIV were offered to four adult guinea pigs of unknown ages as well as to an adult horse and a goat. Though not observed directly, one woman reported that her dog ate a 2-ounce bag of the biscotti, and that there were no ill side effects, not even the typical vomiting that follows dogs eating grass.

In view of the many possible embodiments to which the principles of the disclosed invention may be applied, it should be recognized that the illustrated embodiments are only examples and should not be taken as limiting the scope of the invention.

Unless defined otherwise, all technical and scientific terms herein have the same meaning as commonly understood by one of ordinary skill in the art to which this invention belongs. Although any methods and materials, similar or equivalent to those described herein, can be used in the practice or testing of the present invention, the preferred methods and materials are described herein.

All publications, patents, and patent publications cited are incorporated by reference herein in their entirety for all purposes.

The publications discussed herein are provided solely for their disclosure prior to the filing date of the present application. Nothing herein is to be construed as an admission that the present invention is not entitled to antedate such publication by virtue of prior invention.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set fourth and as follows in the scope of the appended claims.

References

U.S. Pat. No. 3,044,877 to Pelletted animal feed and process to Lent.
U.S. Pat. No. 3,676,150 Low calorie yeast leavened baked products to Glicksman et al.
U.S. Pat. No. 4,219,580 Flour Substitutes to Torres.
U.S. Pat. No. 4,243,686 Process for improving the palatability of straw for animal feed to Israilides et al.
U.S. Pat. No. 4,735,808 Dietetic dog biscuits containing vegetable hulls to Scaglione, et al.
U.S. Pat. No. 4,892,748 Low calorie pet treat to Andersen, et al.
U.S. Pat. No. 4,948,609 Fruit and vegetable dried food product to Nafisi-Movaghar.
U.S. Pat. No. 4,978,548 Method and apparatus for continuous producing of tortilla chips to Cope, et al.
U.S. Pat. No. 5,407,696 Green juices or dry powders thereof to Hagiwara, et al.
U.S. Pat. No. 5,941,197 Carrot-based dog chew to Axelrod.
U.S. Pat. No. 6,132,794 Infusion-drying of carrots to Sinha, et al.
U.S. Pat. No. 6,228,418 Vegetarian pet treat to Gluck, et al.
U.S. Pat. No. 6,270,820 Process for dry stable intermediate pet food composition to Fritz-Jung, et al.
U.S. Pat. No. 6,310,090 Process and product for enhancing immune response in companion animals using a combination of antioxidants to Hayek
U.S. Pat. No. 6,391,375 Pet food containing chicory to Fone
U.S. Pat. No. 6,495,192 Animal feed to Bezreh
U.S. Pat. No. 7,211,280 Condition of elderly pets to Young et al.
U.S. Pat. No. 7,264,841 Savory gluten-free foods to Lester, et al.
U.S. Pat. No. 7,579,038 Edible pet chew to Weinberg
U.S. Pat. No. 7,655,266 Method for making biscuits to Ichiki
U.S. Pat. No. 7,901,725 Production of gluten-free food products using Timothy grass to Johnson, et al.

I claim:

1. A dried, solid animal food product comprising about 21% hay, about 43% pumpkin, about 31% carrot, about 2% fennel, about 0.4% vanilla extract, about 0.2% anise extract, about 0.4% cinnamon, and about 0.2% xanthan gum, wherein the percentages of ingredients are calculated by wet weight prior to drying.

2. A dried, solid animal food product comprising about 20% hay, about 42% pumpkin, about 22% banana, about 12% romaine, about 0.4vanilla extract, about 0.3% banana extract, about 0.4% cinnamon, and about 0.2% xanthan gum, wherein the percentages of ingredients are calculated by wet weight prior to drying.

3. A dried, solid animal food product comprising about 22% hay, about 46% pumpkin, about 22% apple, about 0.6% lavender, about 0.6% roses, about 2hibisens, about 0.6% chamomile, about 2% calendula, about 0.3% rose water, and about 0.2% xanthan gum, wherein the percentages of ingredients are calculated by wet weight prior to drying.

4. The animal food product of claim 1 wherein said hay is about 0.25" to about 0.75" in length.

5. The animal food product of claim 1 further comprising rice hulls.

6. The animal food product of claim 1 further comprising black sunflower seeds.

7. The animal food product of claim 1, further comprising iceberg lettuce.

8. The animal food product of claim 2 wherein said hay is about 0.25" to about 0.75" in length.

9. The animal food product of claim 2 further comprising rice hulls.

10. The animal food product of claim 2 further comprising black sunflower seeds.

11. The animal food product of claim 2 further comprising iceberg lettuce.

12. The animal food product of claim 3 wherein said hay is about 0.25" to about 0.75" in *length*.

13. The animal food product of claim 3 further comprising rice hulls.

14. The animal food product of claim 3 further comprising black sunflower seeds.

15. The animal food product of claim 3 further comprising iceberg lettuce.

\* \* \* \* \*